3,012,062
PROCESS FOR PURIFYING ACRYLONITRILE
Johannes Casper, Leverkusen, Josef Heinen, Leverkusen-Bayerwerk, and Wilhelm Müller, Leverkusen, Germany, assignors to Farbenfabriken Bayer Aktiengesellschaft, Leverkusen, Germany, a corporation of Germany
No Drawing. Filed Apr. 1, 1959, Ser. No. 803,357
Claims priority, application Germany Apr. 5, 1958
3 Claims. (Cl. 260—465.9)

This invention relates to a process for the purifying of acrylonitrile, more particularly it relates to a process for removing methyl vinyl ketone, which is difficult to remove by ordinary distillation.

It is known from German patent specification No. 728,767 that acrylonitrile can be produced by adding hydrocyanic acid to acetylene in the presence of certain catalysts. With this reaction, a large number of secondary products, such as vinyl acetylene, vinyl chloride, divinyl acetylene, acetaldehyde, cyanobutadiene, chlorobutadiene, and methyl vinyl ketone, are formed. Most of these products can be separated by rectification from the acrylonitrile in a simple manner. However methyl vinyl ketone cannot be readily separated in this manner, since the boiling points of acrylonitrile and methyl vinyl ketone are too close together. However on the other hand, it is desirable that this impurity should be substantially completely removed, since this compound has a detrimental effect on many useful purposes of acrylonitrile.

It has already been proposed that the acrylonitrile containing methyl vinyl ketone should be treated with an alkali metal, alkaline earth metal or ammonium bisulphite (see United States specification No. 2,770,645) and the acrylonitrile distilled off from the practically non-volatile addition compound. However all these processes have the disadvantage that either the removal of the ketone is only partially successful or else relatively large quantities of the reagent are necessary if the ketone is to be removed so as only to leave amounts below 100 mg./kg. of acrylonitrile.

It is an object of this invention to improve the purifying process of the prior art so as to make it more efficient and adapted for the complete removal of the methyl vinyl ketone. It is a further object of this invention to improve the purifying process so as to make it possible to prepare pure acrylonitrile in an economical manner. Other objects will be referred to in the following further description.

It has now been found that methyl vinyl ketone can easily be removed from acrylonitrile if the contaminated acrylonitrile is treated at elevated temperature in the acid pH range with thio acids, thio acid amides or organic compounds which contain a mercapto group and if the resulting reaction mixture is subjected to fractional distillation.

Compounds suitable for the process of the invention are for example n-dodecyl mercaptan, tert.-dodecyl mercaptan, octyl mercaptan, mercaptopropionic acids, thiopropionic acid, thiophenol and thiourea.

For carrying out the process, the thio compounds are added to the acrylonitrile containing methyl vinyl ketone, the mixture is acidified and thereafter the acrylonitrile is separated by distillation. The acidification can also take place prior to adding the thio compounds.

The compounds used in the process of the present invention may be added in molar excess, in equimolar quantities or even in a molecular deficiency. In the first case, care should be taken that the thio compound has either a higher or a lower boiling point than the acrylonitrile so that simple separation by distillation is possible. Generally speaking, it is sufficient to add the thio compounds in equimolecular quantities as 90–100% of the methyl vinyl ketone is then combined. It is however surprising that most of the methyl vinyl ketone can be removed when different thio compounds are used in a deficiency of up to 50% of the quantity necessary from stoichiometrical considerations. The reaction products of the thio compounds with the methyl vinyl ketone remain in the sump during distillation, and thus do not interfere with the distillation process.

The treatment of the acrylonitrile is preferably carried out in the acid pH range, advantageously at a pH between 1 and 4. In principle, the acidification can be effected with any desired acid, but p-toluene sulphonic acid has proved particularly desirable as it is the least corrosive. However when using acid-resistant apparatus, it is economically advantageous to work with sulphuric acid. The acid can be added before or after the addition of the thio compound to the acrylonitrile. The reaction between methyl vinyl ketone and the thio compound only starts to an appreciable degree after the acidification. It is advantageous to add stabilizers to prevent polymerization of the acrylonitrile arising from the added thio compounds. The generally known stabilizers such as cyclohexyl pyrocatechol, tertiary butyl pyrocatechol and phenthiazine are suitable for this purpose.

In order to ensure a complete reaction of the methyl vinyl ketone with the thio compounds used according to the process of the invention, the reaction mixture is kept, after the acidification, for a certain time at temperatures between 20 and 80° C., advantageously 40 to 77° C. In this way, the reaction time can also be considerably shortened as at low temperatures, the reaction may take many hours. However, the reaction time is also dependent on the nature of the thio compounds which are added; for example, thiourea reacts substantially more quickly than dodecyl mercaptan. In the case of thiourea, it is possible to start distilling off the acrylonitrile after a reaction time of a few minutes.

The process of the present invention can also be carried out continuously.

The present invention is further disclosed in the following examples which are illustrative but not limitative thereof.

*Example 1*

2.55 parts by weight of n-dodecyl mercaptan, 1.5 parts by weight of p-toluene sulphonic acid and 1.5 parts by weight of cyclohexyl pyrocatechol for stabilization purposes are added to 2400 parts by weight of acrylonitrile with a methyl vinyl ketone content of 590 mg./kg. The mixture is heated, while stirring for 4 hours, to 77° C. and thereafter the acrylonitrile is distilled off. The distillate contains less than 50 mg. of methyl vinyl ketone per kg. of acrylonitrile.

*Example 2*

5.5 parts by weight of tert.-dodecyl mercaptan, 1.2 parts by weight of p-toluene sulphonic acid and, for stabilization purposes, 1.2 parts by weight of cyclohexyl pyrocatechol are added to 2400 parts by weight of acrylonitrile each kg. of which contains 940 mg. of methyl vinyl ketone. The procedure thereafter is as described in Example 1 and the distillate contains less than 100 mg. of methyl vinyl ketone per kg. of acrylonitrile.

*Example 3*

To 160 parts by weight of acrylonitrile with a methyl vinyl ketone content of 600 mg./kg. are added 0.198 part by weight of octyl mercaptan, whereupon it is acidified with p-toluene sulphonic acid to a pH value of 2 and then 0.016 part by weight of cyclohexyl pyrocatechol (as stabilizer) is added. The procedure is then as described in Example 1 and the distillate does not contain any methyl vinyl ketone. 0.145 part by weight of mercaptopropionic acid may be used instead of the octyl mercaptan.

*Example 4*

2.32 parts by weight of thiourea, 5.5 parts by weight of concentrated sulphuric acid and 0.48 part by weight of cyclohexyl pyrocatechol as stabilizer are added to 2400 parts by weight of acrylonitrile containing 890 mg. of methyl vinyl ketone per kg. Thereafter the procedure is as described in Example 1 and the distillate contains less than 100 mg. of methyl vinyl ketone per kg. of acrylonitrile.

*Example 5*

The processes set forth in Examples 1 to 4 are also suitable for being carried out continuously, for example as follows:

To each litre of acrylonitrile with a methyl vinyl ketone content of 590 mg. per kg. are added 1 part by weight of n-dodecyl mercaptan, 0.5 part by weight of p-toluene sulphonic acid and, for stabilizing purposes, 0.5 part by weight of cyclohexyl pyrocatechol. 100 parts by volume per hour of this mixture are introduced dropwise into a flask fitted with a stirrer. This flask already contains 500 parts by volume of the mixture, which has been heated to 77° C. and which is to be kept at this temperature as the experiment progresses. By means of a pump, 100 parts by volume per hour are transferred into a second flask from which the nitrile is to be continuously distilled off at such a rate that the flask retains a content of 300 parts by volume. Each kg. of acrylonitrile distilling over contains less than 30 mg. of methyl vinyl ketone. In addition, about 5% of the quantity of nitrile passed through are withdrawn in liquid form and separately distilled. The contaminated nitrile thereby formed is added to the crude acrylonitrile in the manufacturing process.

What we claim is:

1. Process for purifying acrylonitrile containing methyl vinyl ketone as impurity by removal therefrom of the methyl vinyl ketone which comprises treating acrylonitrile containing methyl vinyl ketone at a temperature of from about 20° C. to about 80° C. at a pH between about 1–4 and in the presence of a stabilizer for the acrylonitrile with about 0.5 mol–1 mol based on the methyl vinyl ketone of a compound selected from the group consisting of alkyl mercaptans, containing 8–12 carbon atoms in the alkyl radical, thiopropionic acid, mercaptopropionic acids, thiophenol and thiourea and isolating the acrylonitrile substantially free of methyl vinyl ketone from the resulting reaction mixtures by fractional distillation.

2. Process according to claim 1 wherein said stabilizer is a member selected from the group consisting of cyclohexyl pyrocatechol, tertiary butyl pyrocatechol and phenthiazine.

3. Process according to claim 1 wherein said reaction is effected at a temperature of from 40 to 77° C.

References Cited in the file of this patent
UNITED STATES PATENTS
2,770,645    McDonald et al. _____ Nov. 13, 1956

OTHER REFERENCES

Tsuruta: Chem. Abst., vol. 49, col. 6183 (1955).